United States Patent
Hong et al.

(10) Patent No.: US 7,332,559 B2
(45) Date of Patent: Feb. 19, 2008

(54) METHOD OF PREPARING POLYCARBONATE RESIN

(75) Inventors: Mijeung Hong, Daejeon (KR); Jong Hun Kim, Daejeon (KR); Sung Kyou Park, Dusan (KR); Boo Gon Woo, Daejeon (KR)

(73) Assignee: LG Chem, Ltd. (KR)

( * ) Notice: Subject to any disclaimer, the term of this patent is extended or adjusted under 35 U.S.C. 154(b) by 141 days.

(21) Appl. No.: 11/255,515

(22) Filed: Oct. 21, 2005

(65) Prior Publication Data

US 2006/0089484 A1    Apr. 27, 2006

(30) Foreign Application Priority Data

Oct. 21, 2004    (KR) .................. 10-2004-0084355
Dec. 3, 2004     (KR) .................. 10-2004-0101103

(51) Int. Cl.
*C08G 64/00* (2006.01)
(52) U.S. Cl. .............. 528/196; 502/150; 525/100; 526/196; 528/198
(58) Field of Classification Search .............. 502/150; 525/100; 526/196; 528/196, 198
See application file for complete search history.

(56) References Cited

U.S. PATENT DOCUMENTS 5,530,083 A    6/1996   Phelps et al. ............... 528/25
5,717,056 A    2/1998   Varadarajan et al. ........ 528/196
6,232,429 B1   5/2001   Banach et al. ............... 528/176
6,252,013 B1   6/2001   Banach et al. ............... 525/464
6,486,294 B1   11/2002  Brack et al. ................. 528/198

FOREIGN PATENT DOCUMENTS

JP    2000-281769      10/2000
KR    1020030092361    12/2003
KR    1020040032195    4/2004

OTHER PUBLICATIONS

PCT Written Opinion for Application No. PCT/KR2005/003517; Date of Mailing: Jan. 26, 2006.
PCT International Search Report for Application No. PCT/KR2005/003517; Date of Mailing: Jan. 26, 2006.

*Primary Examiner*—Terressa Boykin
(74) *Attorney, Agent, or Firm*—Lerner, David, Littenberg, Krumholz & Mentlik, LLP

(57) ABSTRACT

A method of preparing a high molecular weight polycarbonate resin is provided. In the method, a condensation polymerization process is used so that a mole fraction of arylcarbonate existing in a terminated group of a reaction side product having a degree of polymerization of less than 3 obtained as a result of transesterification and in a non-reacted diarylcarbonate is reduced. As a result, a high molecular weight polycarbonate can be obtained by solid state polymerization. A polycarbonate with an identical molecular weight can be produced in a substantially short time, compared with a polycarbonate produced through solid state polymerization without condensation polymerization. In addition, the non-use of a poisonous phosgene contributes to stability. Furthermore, quality polycarbonate may be guaranteed.

26 Claims, No Drawings

METHOD OF PREPARING POLYCARBONATE RESIN

CROSS-REFERENCE TO RELATED PATENT APPLICATIONS

This application claims the benefit of Korean Patent Application Nos. 10-2004-0084355, filed on Oct. 21, 2004; and 10-2004-0101103, filed on Dec. 3, 2004, in the Korean Intellectual Property Office, the disclosures of which are incorporated herein in their entirety by reference.

BACKGROUND OF THE INVENTION

1. Field of the Invention

The present invention relates to a method of preparing a polycarbonate resin, the method including a condensation polymerization for decreasing a mole fraction of arylcarbonate existing in a non-reacted diarylcarbonate, and in a terminated group of a reaction side product having a degree of polymerization of less than 3 produced through transesterification, thus maximizing an increase of the molecular weight of the polycarbonate resin, such as a siloxane-based polycarbonate or a polyester carbonate, produced through solid state polymerization, and substantially reducing the preparation time for the polycarbonate resin.

2. Description of the Related Art

Polycarbonate resins have excellent heat resistance, impact resistance, mechanical strength, and transparency. Due to these advantages, polycarbonate resins are used in various applications, such as compact discs, transparent sheets, packaging materials, mobile bumpers, and ultraviolet (UV)-blocking films, and thus, the demand for polycarbonate resins is increasing.

However, polycarbonates have low solvent resistance, and low impact resistance at low temperature. For example, when polycarbonates are exposed to commonly used solvents, crazing or cracking occurs. Many efforts have been made to overcome these problems, and various modified polycarbonates have been developed. In particular, siloxane-based polycarbonates and polyester carbonates exhibit superior low-temperature impact resistance, molding, and fluidity.

Conventional manufacturing processes for polycarbonate may be categorized into interfacial polymerization processes in which phosgene is used, and melt condensation polymerization processes and solid state polymerization processes in which phosgene is not used.

An interfacial polymerization process, as disclosed in U.S. Pat. No. 5,530,083, includes an operation of reacting an aromatic hydroxy compound, a dihydroxy compound, phosgene, and a catalyst with hydroxyaryl terminated polydioganosiloxane. In this case, high-molecular weight siloxane-based polycarbonate resins can be relatively easily produced by a continuous process. However, the process is accompanied by a risk caused by the use of poisonous gases and a chloride-based organic solvent, which is an environmental pollutant, and thus, the manufacturing costs are high.

A melt condensation polymerization process, as disclosed in U.S. Pat. Nos. 6,252,013 and 6,232,429, includes an operation of performing polymerization to produce polyester carbonate after a starting material is dissolved. The melt condensation polymerization process is relatively stable because a poisonous material is not used. However, in order to produce high-molecular weight polycarbonate for extrusion, a reaction between elements with high viscosity must be handled at a high temperature and in a high vacuum, and these conditions bring about a low quality of polycarbonate.

A solid state polymerization process is a process in which a low-molecular weight polycarbonate prepolymer is crystallized and the crystallized prepolymer is polymerized at a temperature lower than a melting point of the crystallized prepolymer. In this case, a poisonous material is not used, and the quality of an obtained polycarbonate can be guaranteed because the polymerization occurs in a solid state. In general, however, the crystallization and the solid state polymerization are performed without removing reaction side products having a degree of polymerization of less than 3 and non-reacted diarylcarbonate which co-exists with a relatively low-molecular weight prepolymer (weight average molecular weight of 2000 to 20000 g/mol). As a result, the difference between moles of an aromatic group and arylcarbonate group is increased, thereby prolonging the manufacturing time for a high-molecular weight polycarbonate.

Accordingly, there is a need to develop a polycarbonate manufacturing method that is stable, guarantees quality, and requires only a short time to produce a high-molecular weight polycarbonate.

SUMMARY OF THE INVENTION

The present invention provides a method of preparing a polycarbonate resin. The method, which has a short reaction time for solid state polymerization due to the use of reduced-pressure condensation, is not risky because a poisonous phosgene is not used, and guarantees quality.

The present invention also provides a polycarbonate resin that is produced using the method.

According to an aspect of the present invention, there is provided a method of preparing a polycarbonate resin, the method including: transesterifing diarlycarbonate, an aromatic dihydroxy compound, and polysiloxane in the presence of a catalyst to produce a low molecular weight amorphous polycarbonate prepolymer having a weight average molecular weight (Mw) of 1,500 to 20,000 g/mol; condensation polymerizing the low molecular weight amorphous polycarbonate prepolymer to produce a medium molecular weight amorphous polycarbonate having an Mw of 10,000 to 30,000 g/mol; crystallizing the medium molecular weight amorphous polycarbonate to produce a crystallized polycarbonate; and solid state polymerizing the crystallized polycarbonate to produce a high molecular weight polycarbonate having the Mw of 20,000 to 200,000 g/mol.

According to another aspect of the present invention, there is provided a method of preparing a polycarbonate resin, the method including: transesterifing diarlycarbonate, an aromatic dihydroxy compound, and a dicarboxylic acid compound in the presence of a catalyst to produce a low molecular weight amorphous polycarbonate prepolymer having a weight average molecular weight (Mw) of 1,500 to 20,000 g/mol; condensation polymerizing the low molecular weight amorphous polycarbonate prepolymer to produce a medium molecular weight amorphous polycarbonate having an Mw of 10,000 to 30,000 g/mol; crystallizing the medium molecular weight amorphous polycarbonate to produce a crystallized polycarbonate; and solid state polymerizing the crystallized polycarbonate to produce a high molecular weight polycarbonate having an Mw of 20,000 to 200,000 g/mol.

DETAILED DESCRIPTION OF THE INVENTION

The inventors of the present invention have studied a way to increase the molecular weight of polycarbonate in a short time and found that when a condensation polymerization process is performed at a temperature, under a reduced pressure or in a nitrogen atmosphere, the mol fraction of arylcarbonate, which exists in a terminated group of a reaction side product having a degree of polymerization of less than 3 obtained as a result of transesterification and in a non-reacted diarylcarbonate, decreases. As a result, an increase in the a molecular weight of polycarbonate after solid state polymerization can be maximized and a high-molecular weight polycarbonate can be produced in a substantially short time.

Step 1: Transesterification Process

An aromatic dihydroxy compound that is a starting material according to an embodiment of the present invention may be a compound represented by formula 1:

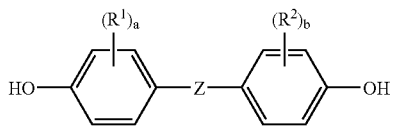

(1)

where $R^1$ and $R^2$ are each independently a halogen atom or a C1-C8 alkyl group, wherein the halogen atom may be F, Cl, Br, or 1, and the C1-C8 alkyl group may be a methyl group, an n-propyl group, an isopropyl group, an n-butyl group, an isobutyl group, a sec-butyl group, a t-butyl group, a pentyl group, a hexyl group, a cyclohexyl group, a heptyl group, or an oxtyl group;

Z is a single bond, a C1-C8 alkylene group, a C2-C8 alkyliden group, a C5-C15 cycloalkylene group, a C5-C15 cycloalkylidene group, —S—, —SO—, —SO$_2$—, —O—, —CO—, a compound represented by formula 2, or a compound represented by formula 3, wherein the C1-C8 alkylene group or C2-C8 alkylidene group may be a methylene group, an ethylene group, a propylene group, a butylenes group, a pentylene group, a hexylene group, an ethylidene group, an isopropylidene group, or the like, and the C5-C15 cycloalkylene group or C5-C15 cycloalkylidene group may be a cyclopentylene group, a cyclohexylene group, a cyclopentylidene group, or a cyclohexylidene group; and a and b are each independently an integer of 0 through 4:

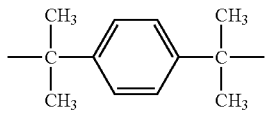

(2)

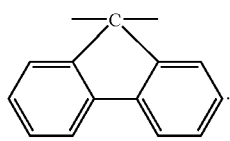

(3)

The aromatic dihydroxy compound represented by formula 1 may be bis(hydroxyaryl)alkane, such as bis(4-hydroxyphenyl)methane, bis(3-methyl-4-hydroxyphenyl) methane, bis(3-chloro-4-hydroxyphenyl)methane, bis(3,5-dibromo-4-hydroxyphenyl)methane, 1,1-bis(4-hydroxyphenyl)ethane, 1,1-bis(2-t-butyl-4-hydroxy-3-methylphenyl)ethane, 2,2-bis(4-hydroxyphenyl)propane (bisphenol A), 2,2-bis(3-methyl-4-hydroxyphenyl)propane, 2,2-bis(2-methyl-4-hydroxyphenyl)propane, 2,2-bis(3,5-dimethyl-4-hydroxyphenyl)propane, 1,1-bis(2-t-butyl-4-hydroxy-5-methylphenyl)propane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(4-hydroxyphenyl)butane, 2,2-bis(4-hydroxyphenyl)octane, 2,2-bis(4-hydroxyphenyl) phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 2,2-bis(4-hydroxy-3,5-dibromophenyl)propane, 2,2-bis(3-bromo-4-hydroxy-5-chlorophenyl)propane, 2,2-bis(3-phenyl-4-hydroxyphenyl) propane, 2,2-bis(4-hydroxyphenyl)butane, 2,2-bis(3-methyl-4-hydroxyphenyl)butane, 1,1-bis(2-butyl-4-hydroxy-5-methylphenyl)butane, 1,1-bis(2-t-butyl-4-hydroxy-5-methylphenyl)butane, 1,1-bis(2-t-butyl-4-hydroxy-5-methylphenyl)isobutane, 1,1-bis(2-t-amyl-4-hydroxy-5-methylphenyl)butane, 2,2-bis(3,5-dichloro-4-hydroxyphenyl)butane, 2,2-bis(3,5-dibromo-4-hydroxyphenyl)butane, 4,4-bis(4-hydroxyphenyl)heptane, 1,1-bis(2-t-butyl-4-hydroxy-5-methylphenyl)heptane, 2,2-bis(4-hydroxyphenyl)octane, 1,1-(4-hydroxyphenyl)ethane, or the like; bis(hydroxyaryl)cycloalkane, such as 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(3-cyclohexyl-4-hydroxyphenyl)cyclohexane, 1,1-bis(3-phenyl-4-hydroxyphenyl)cyclohexane, 1,1-bis(4-hydroxyphenyl)-3,5,5-trimethylcyclohexane, or the like; bis(hydroxyaryl)ether, such as bis(4-hydroxyphenyl)ether, bis(4-hydroxy-3-methylphenyl)ether, or the like; bis(hydroxyaryl)sulfide, such as bis(4-hydroxyphenyl)sulfide, bis(3-methyl-4-hydroxyphenyl)sulfide, or the like; bis(hydroxyaryl)sulfoxide, such as bis(hydroxyphenyl)sulfoxide, bis(3-methyl-4-hydroxyphenyl)sulfoxide, bis(3-phenyl-4-hydroxyphenyl)sulfoxide, or the like; bis(hydroxyaryl)sulfone, such as bis(4-hydroxyphenyl)sulfone, bis(3-methyl-4-hydroxyphenyl)sulfone, bis(3-phenyl-4-hydroxyphenyl) sulfone, or the like; or dihydroxybiphenyl, such as 4,4'-dihydroxyphenyl, 4,4'-dihydroxy-2,2'-dimethylbiphenyl, 4,4'-dihydroxy-3,3'-dimethylbiphenyl, 4,4'-dihydroxy-3,3'-dicyclohexylbiphenyl, 3,3-difluoro-4,4'-dihydroxybiphenyl, or the like.

The aromatic dihydroxy compound may be, in addition to the compound represented by formula 1, dihydroxybenzene that is substituted with dihydroxybenzene, halogen, or an alkyl group. For example, the aromatic dihydroxy compound may be resorcinol, 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, 2,3,4,6-tetrabromoresorcinol, catechol, hydroquinone, 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,5-dichlorohydroquinone, 2,3,5,6-tetramethylhydroquinone, 2,3,5,6-tetra-t-butylhydroquinone, 2,3,5,6-tetrafluorohydroquinone, 2,3,5,6-tetrabromohydroquinone, or the like.

The aromatic dihydroxy compound according to an embodiment of the present invention may be a bisphenol A.

Diarylcarbonate according to an embodiment of the present invention may be a compound represented by formula 4 or a compound represented by formula 5:

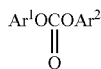   (4)

where Ar$^1$ and Ar$^2$ are each independently an aryl group, and

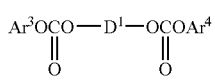   (5)

where Ar$^3$ and Ar$^4$ are each independently an aryl group, and D$^1$ is a residue obtained by removing two hydroxyl groups from the aromatic dihydroxy compound represented by formula 1.

The diarylcarbonate represented by formula 4 or formula 5 may be diphenyl carbonate, ditolyl carbonate, bis(chlorophenyl)carbonate, bis(m-cresyl)carbonate, dinaphtyl carbonate, bis(diphenyl)carbonate, bisphenol A-bisphenolcarbonate, or the like.

Preferably, the diarylcarbonate is the diphenyl carbonate.

A polysiloxane compound according to an embodiment of the present invention may be a compound represented by formula 6:

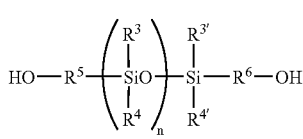   (6)

where n is an integer of 1 through 500;

R$^3$, R$^{3'}$, R$^4$ and R$^{4'}$ are each independently a hydrogen atom or a C1-C20 alkyl group, wherein some or all of the hydrogen atoms of the alkyl group may be substituted with halogen atoms;

R$^5$ and R$^6$ are each independently a linear or branched C1-C20 alkylene group, a monocyclic or polycyclic C6-C30 arylene group, or —R$^7$—X—R$^8$—, wherein R$^7$ and R$^8$ are each independently a substituted or nonsubstituted C1-C20 alkylene group or a substituted or nonsubstituted C6-C30 arylene group; and X is —O—, —S—, —SO—, —SO$_2$—, or —CO—.

The polysiloxane compound represented by formula 6 may be polydialkylsiloxane-bisalkyloxyalcohol or the like.

The polysiloxane compound may be a compound represented by formula 7:

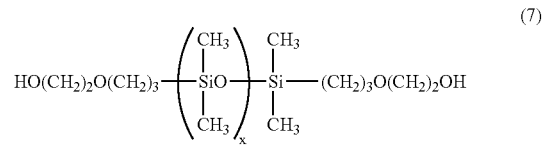   (7)

where x is an integer of 1 through 500.

A dicarboxylic acid according to an embodiment of the present invention may be a compound represented by formula 8:

HOOC—R$^9$—COOH   (8)

where R$^9$ is a substituted or nonsubstituted C4-C30 aryl group, a substituted or nonsubstituted C1-C10 alkyl group, or a substituted or nonsubstituted C5-C30 cycloalkyl group.

The dicarboxylic acid may be an acid selected from the group consisting of 1,10-decandicarboxylic acid, oxalic acid, succinic acid, glutaric acid, adipic acid, pimelinic acid, sebacic acid, decandionic acid, dodecandionic acid, terephthalic acid, isophthalic acid, and a combination of these.

For example, the dicarboxylic acid may be 1,10-decandicarboxylic acid.

The concentration of the dicarboxylic acid may be in the range of 10$^{-4}$ to 1 mol, preferably, 10$^{-3}$ to 0.5 mol, more preferably, 0.05 to 0.1, based on 1 mol of the diarylcarbonate. When the concentration of the dicarboxylic acid is outside this range, a polyester carbonate may not exhibit desired physical properties.

The concentration of the diarylcarbonate may be in the range of 1.0 to 1.5 mol, preferably, 1.0 to 1.3 mol, more preferably, of 1.0 to 1.2 mol, based on 1 mol of the dihydroxy compound. When the concentration of the diarylcarbonate is outside this range, a degree of polymerization given by the following equation is low:

$$\overline{X}_n = \frac{1+r}{1+r-2rp}$$ [Equation 1]

where r is a mol ratio of a hydroxy compound with respect to a carbonate group, Xn is a degree of polymerization, and p is an extent of reaction. When p is 1.0, Equation 1 becomes Equation 2. In this case, when r is very close to 1.0, the degree of polymerization can be maximized in a short time:

$$\overline{X}_n = \frac{1+r}{1-r}.$$ [Equation 2]

In the polysiloxane compound, the amount of a repeat unit of siloxane may be in the range of 0.01 to 20 mol %, preferably, of 0.1 to 15 mol %, and more preferably, of 0.5 to 5 mol %, based on 1 mole of the dihydroxy compound. When the amount of the siloxane repeat unit is less than 0.01 mol %, no effect occurs. When the amount of the siloxane repeat unit is greater than 20 mol %, the concentration of the polysiloxane increases locally and the polysiloxane gels. Such gelling disadvantageously affects the reaction.

A polymerization catalyst that is used in the current embodiment may be a metal compound catalyst, a non-metal compound catalyst, or a combination of these. The metal compound catalyst may be a salt compound, such as a hydroxide, acetate, alkoxide, carbonate, hydride, hydrate, or oxide of an alkali metal or an alkali earth metal; an organomettalic compound containing a transition metal, such as Zn, Cd, Ti, or Pb; an aluminum hydride; or borohydride.

The non-metal compound catalyst may be a quaternary ammonium salt, such as tetramethyl ammonium hydroxide, tetramethyl ammonium acetate, tetramethyl ammonium formate, tetramethyl ammonium carbonate, tetraethyl ammonium hydroxide, tetrapropyl ammonium hydroxide, tetrabutyl ammonium hydroxide, tetraphenyl ammonium hydroxide, trimethylphenyl ammonium hydroxide, or the like; a quaternary phosphonium salt, such as tetramethyl phosphonium hydroxide, tetramethyl phosphonium acetate, tetramethyl phosphonium formate, tetramethylphosphonium carbonate, tetraethyl phosphonium hydroxide, tetrapropyl phosphonium hydroxide, tetrabutyl phosphonium hydroxide, tetraphenyl phosphonium hydroxide, trimethylphenyl phosphonium hydroxide, or the like; a primary, secondary, or tertiary amine compound; or a nitrogen-containing aromatic derivative, such as pyridine.

The concentration of the non-metal compound catalyst may be in the range of $10^{-6}$ to $10^{-1}$ mol, preferably, $10^{-5}$ to $10^{-2}$ mol, and more preferably, of $10^{-4}$ to $10^{-3}$ mol, based on 1 mol of the dihydroxy compound that is used as a starting material for the transesterification process in the current embodiment of the present invention. When the concentration of the non-metal compound catalyst is less than $10^{-6}$ mol based on 1 mol of the dihydroxy compound, the non-metal compound catalyst fails to sufficiently exert its activity at the beginning of the reaction. When the concentration of the non-metal compound catalyst is greater than $10^{-1}$ mol based on 1 mol of the dihydroxy compound, the production costs are high.

The compound containing an alkali metal or alkali earth metal may be, but is not limited to, a hydroxide, carbonate, acetate, alkoxide, or borohroride compound which contains Li, Na, K, Ru, Cs, Be, Mg, Ca, Sr, Ba, or the like.

The concentration of the compound containing an alkali metal or an alkali earth metal may be in the range of $10^{-8}$ to $10^{-3}$ mol, preferably, of $10^{-7}$ to $10^{-4}$ mol, and more preferably, of $10^{-6}$ to $10^{-5}$ mol, based on 1 mol of the dihydroxy compound that is used as a starting material for the transesterification process in the current embodiment of the present invention. When the concentration of the compound containing an alkali metal or an alkali earth metal is less than $10^{-8}$ mol based on 1 mol of the dihydroxy compound, the catalyst fails to sufficiently exert its activity after the reaction. When the concentration of the compound containing an alkali metal or an alkali earth metal is greater than $10^{-3}$ mol, the production costs are high, and the physical properties, such as heat resistance and hydrolysis resistance, of the siloxane-based polycarbonate resin that is the final product may be affected.

Meanwhile, when a polycarbonate prepolymer is produced through transesterification of diarylcarbonate, the aromatic dihydroxy compound, and the dicarboxylic acid, a polymerization catalyst used may be a tin-based catalyst.

The tin-based catalyst may be a tin compound selected from the group consisting of dialkyltin trichloride, dialkyltin dichloride, dialkyltin oxide, dialkyltin dialkoxide, dialkyltin dicarboxylate, and tetraalkyl tin, wherein the alkyl may be a C1-C20 alkyl, preferably, a C1-C10 alkyl, and more preferably, a C1-C6 alkyl.

The tin-based catalyst may be one of the compounds represented by

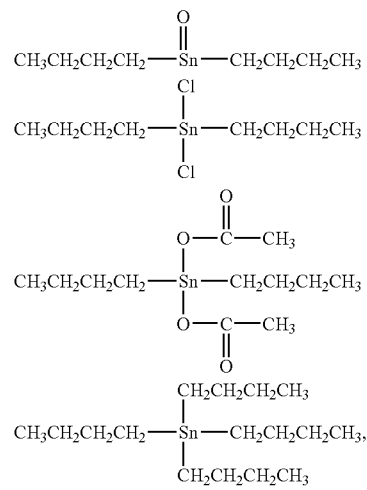

and preferably, the dibutyltin oxide.

The tin-based catalyst is more suitable than an alkali earth metal catalyst, a quaternary ammonium salt catalyst, and an antimony-based catalyst in terms of color, transparency, and reactivity.

The concentration of the tin-based catalyst may be in the range of $10^{-6}$ to $10^{-1}$ mol, preferably, of $10^{-5}$ to $10^{-2}$ mol, and more preferably, of $10^{-4}$ to $10^{-3}$ mol, based on 1 mol of the dihydroxy compound. When the concentration of the tin-based catalyst is less than $10^{-6}$ mol_based on 1 mol of the dihydroxy compound, the tin-based catalyst fails to sufficiently exert its activity at the beginning of the reaction. When the concentration of the tin-based catalyst is greater than $10^{-1}$ mol based on 1 mol of the dihydroxy compound, the production costs are high.

When the polycarbonate resin is produced through the transesterification process, if needed, additives, including a terminator, an antioxidant, or the like, may be additionally used.

The terminator may be o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 3,5-di-cumylphenol, 3,5-dicumylphenol, a compound represented by formula 9, a compound represented by formula 10, a compound represented by formula 11, a compound represented by formula 12, a compound represented by formula 13, a compound represented by formula 14, or a monovalent phenol, such as a croman derivative represented by formula 15 or formula 16:

(9)

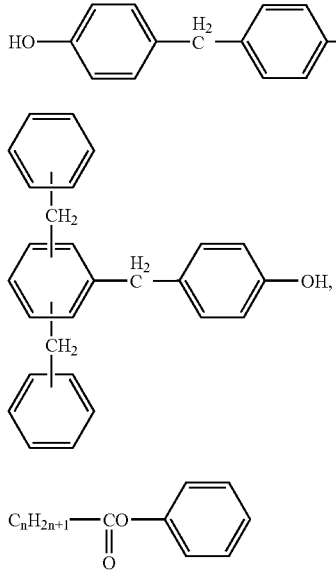

(10)

(11)

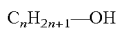

where n is an integer of 7 through 30, $C_nH_{2n+1}$—OH (12)

where n is an integer of 7 through 30,

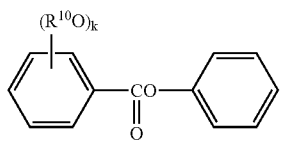 (13)

where $R^{10}$ is a C1-C12 alkyl group and k is an integer of 1 through 3,

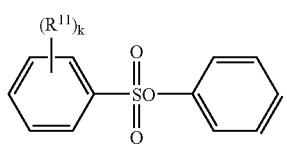 (14)

where $R^{11}$ is a C1-C12 alkyl group and k is an integer of 1 through 3,

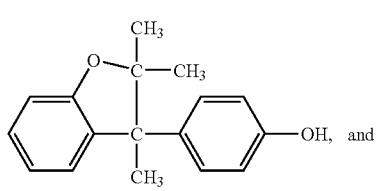 (15)

-continued

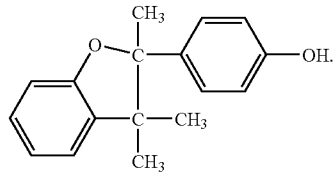 (16)

Preferably, the terminator is one of p-t-butylphenol, p-cumylphenol, p-phenylphenol, and the compounds represented by formulae 13 through 16.

The concentration of the terminator may be in the range of 0.01 to 10 mol % based on 1 mol of the aromatic dihydroxy compound that is used as a starting material for the transesterification process in the current embodiment of the present invention.

The entire amount of the terminator may be added at the beginning of the transesterification. Alternatively, the terminator may be added gradually in portions throughout the transesterification. Alternatively, the entire amount of the terminator may be added at a specified time after the beginning of the transesterification of the aromatic dihydroxy compound and the diarylcarbonate.

The antioxidant may be a phosphor-based antioxidant. The phosphine-based antioxidant may be a trialkyl phosphite, such as trimethyl phosphite, triethyl phosphite, tributyl phosphite, trioctyl phosphite, trinonyl phosphite, tridecyl phosphite, trioctadecyl phosphite, distearyl pentaeritritol diphosphite, tris(2-chloroethyl)phosphite, or tris(2,3-dichloropropyl)phosphite, or the like; a tricycloalkyl phosphite, such as tricyclohexyl phosphite, or the like; a triaryl phosphite, such as triphenyl phosphite, tricresyl phosphite, tris(ethylphenyl)phosphite, tris(butylphenyl)phosphite, tris(nonylphenyl)phosphite, tris(hydroxyphenyl)phosphite, or the like; a monoalkyl diaryl phosphite, such as 2-ethylhexyl diphenyl phosphite, or the like; a trialkyl phosphate, such as trimethyl phosphate, triethyl phosphate, tributyl phosphate, trioctyl phosphate, tridecyl phosphate, trioctadecyl phosphate distearyl pentaeritritol diphosphate, tris(2-chloroethyl) phosphate, tris(2,3-dichloropropyl)phosphate, or the like; a tricycloalkyl phosphate, such as tricyclohexyl phosphate, or the like; or a triaryl phosphate, such as triphenyl phosphate, tricresyl phosphate, tris(nonylphenyl)phosphate, 2-ethylphenyl diphenyl phosphate, or the like.

According to the method of producing a polycarbonate resin according to an embodiment of the present invention, the aromatic dihydroxy compound and the diaryl carbonate are subjected to transesterification in the presence of the polymerization catalyst. In this case, additives, including a terminator, a branching agent, an antioxidant, and the like, may be further added.

The terminator, the branching agent, and the antioxidant that are added may be in a powder, liquid, or gaseous state. The use of the terminator, the branching agent, and the antioxidant contributes to the quality of siloxane-based polycarbonate resin.

The temperature for the transesterification is not limited, however, the transesterificaiton may occur at 100 to 330° C., preferably, 180 to 300° C., and more preferably, at a temperature that is gradually increased from 180° C. to 300° C. When the reacting temperature is lower than 100° C., the transesterification occurs slowly. When the reacting temperature is higher than 330° C., side reactions may occur, or the generated siloxane-based polycarbonate resin may be colored.

The pressure for the transesterification is not limited, and may be controlled according to a vapor pressure of a monomer that is used and a reacting temperature. At the beginning of the transesterification, the pressure is in the range of 1 to 10 atm (increased pressure state), and at the end of the transesterificaiton, the pressure is reduced to 0.1 to 100 mbar (reduced pressure state).

The reaction time for the transesterification may be prolonged until a desired molecular weight is obtained. Typically, the reaction time for the transesterification can be in the range of 0.2 to 10 hours.

The desired weight average molecular weight (Mw) may be in the range of 1,500 to 20,000 g/mol. More particularly, when the siloxane-based polycarbonate is produced, the Mw is in the range of 1,500 to 20,000 g/mol, and when a polyester carbonate is produced, the Mw is in the range of 1,500 to 20,000 g/mol.

Typically, transesterification occurs in the absence of an inert solvent. However, when needed, transesterification occurs in the presence of 1 to 150 parts by weight of an inert solvent based on 100 parts by weight of the produced polycarbonate resin. The inert solvent may be an aromatic compound, such as diphenyl ether, halogenated diphenyl ether, benzophenone, polyphenylene ether, dichlorobenzene, methylnaphthalene, or the like; or a cycloalkane, such as tricyclo(5,2,10)decane, cyclooctane, cyclodecane, or the like.

In some cases, the transesterification may occur in an inert gas atmonsphere. The inert gas may be a gas, such as Ar, $CO_2$, $N_2O$, or $N_2$; chlorofluoro hydrocarbonate; alkane, such as ethane or propane; or alkene, such as ethylene or propylene.

As a result of transesterification in the above conditions, a phenol corresponding to the used dialrylcarboante or an ester thereof, or an inert solvent are separated from reacting elements. These separated elements may be separated, purified, and reproduced. The transesterification may be performed in batch or continuously using a predetermined apparatus. In this case, the reactor for the transesterification may be any reactor that has a mixing function. For example, the reactor may have a high viscosity-type mixing function because the viscosity of reacting elements increases in a late portion of the reaction.

The reactor may have a shape of a container or of an extruding device used.

Step 2: Condensation Polymerization

The low molecular weight polycarbonate prepolymer with the Mw of 1,500 to 20,000 g/mol, which is prepared through the transesterification, is subjected to condensation polymerization either under a reduced pressure at high temperature or in a nitrogen atmosphere. As a result of the condensation polymerization, diarylcarbonate that does not react during the transesterification, a reaction side product having a degree of polymerization of less than 3, and a reaction side product that is produced during the reaction are removed, and an amorphous polycarbonate with a greater molecular weight than the low molecular weight of amorphous polycarbonate prepolymer, is produced.

Through the condesation polymerization, phenol, non-reacted diarylcarbonate, and the reaction side product having a degree of polymerization of less than 3 are vaporized to be extracted outside the reactor. Such a removing process is effective to provide the high molecular weight crystallized polycarbonate, which is produced through solid state polymerization, with a greater molecular weight than a conventional process.

In a conventional process, excess diarylcarbonate that is not used in the transesterification process, and the reaction side product having a degree of polymerization of less than 3 are not removed through a condensation polymerization process before the solid state polymerization. In addition, as the molecular weight of the prepolymer increases, the difference between a mole of arylcaronate that is positioned in an end of the produced prepolymer and a mole of the aromatic hydroxy compound is increased. Therefore, a long time is required to produce a high molecular weight polycarbonate through the solid state polymerization process.

The condensation polymerization according to the current embodiment of the present invention may be performed using a conventional condensation reactor, such as a rotating disk reactor, a rotating cage reactor, or a thin film reactor.

The condensation polymerization may be performed at 180 to 330° C., and preferably, 200 to 300° C.

In the condensation polymerization process, the non-reacted dialkyl(aryl)carbonate that exists after the transesterification, the reaction side product having a degree of polymerization of less than 3, and phenol that is a side product of the transesterification are removed under a reduced pressure of 0-50 mmHg, preferably 0-20 mmHg, at the high temperature range described above.

According to an embodiment of the present invention, nitrogen injection may be used instead of the reduced pressure to remove the reaction side products. In this case, the amount of nitrogen that is injected is in the range of 0.01 to 1.0 $Nm^3$/kg·h. The reaction time may vary according to the reacting conditions, and may be in the range of 2 to 120 minutes.

The Mw of the medium molecular weight amorphous polycarbonate prepared in the above-described process may be in the range of 3,000 to 30,000 g/mol.

When a siloxane-based polycarbonate is produced, the Mw may be in the range of 10,000 to 30,000 g/mol, and when a polyester carbonate is produced, the Mw may be in the range of 10,000 to 30,000 g/mol Step 3: Crystallization and Solid State Polymerization Process The amorphous polycarbonate with the Mw of 3,000 to 30,000 g/mol prepared through the condensation polymerization is subjected to solid state polymerization process to produce a polycarbonate resin.

The prepolymerized polycarbonate obtained through the transesterification and the condensation polymerization is heated into a solid state either in an inert gas atmosphere or under a reduced pressure. That is, the prepolymerized polycarbonate becomes a high molecular weight polycarbonate through the solid state polymerization.

The Mw of the medium molecular weight polycarbonate that is used for the solid sate polymerization may be in the range of 3,000 to 30,000 g/mol, and preferably, 5,000 to 25,000 g/mol. When the Mw of the medium molecular weight polycarbonate is less than 3,000 g/mol, the solid state polymerization is prolonged.

However, the amorphous polycarbonate is crystallized before the solid state polymerization is performed. The crystallizing process may increase the melting point of the polycarbonate, and prevent fusing of the polycarbonate when the solid state polymerization proceeds.

The method for crystallization is not limited. For example, a solvent processing method or heat crystallizing method may be used.

According to the solvent processing method, the amorphous polycarbonate is dissolved in a proper solvent, and then the used solvent is vaporized. Then, a nonsolvent with respect to the amorphous polycarbonate is added to precipitate a solid amorphous polycarbonate. Alternatively, a liquid or vapor solvent that has a low solubility with respect to the amorphous polycarbonate contacts the amorphous polycarbonate such that the amorphous polycarbonate is impregnated with the solvent and thus crystallized.

The solvent suitable for the solvent processing method for the amorphous polycarbonate may an aliphatic halogenated hydrocarbon, such as chloromethane, methylene chloride, chloroform, carbon tetrachloride, chloroethane, dichloroethane, trichloroethane, trichloroethylene, tetrachloroethane, or the like; an aromatic halogenated hydrocarbon, such as chlorobenzene, dichlorobenzene, or the like; an ether compound, such as a tetrahydrofurane, dioxane, or the like; an ester compound, such as methyl acetate, ethyl acetate, or the like; a ketone compound, such as acetone or methyl ethylketone, or the like; or an aromatic hydrocarbon, such as benzene, toluene, xylene, or the like.

The amount of the solvent suitable for the solvent processing method is dependent on the kinds of the amorphous polycarbonate or the solvent, the degree of crystallization that is required, a processing temperature, or other conditions. More particularly, the amount of the solvent suitable for the solvent processing method may be 0.05 to 100 times, and preferably, 0.1 to 50 times, the amount of the amorphous polycarbonate.

According to the heat crystallizing method, the amorphous polycarbonate is heated to a temperature, which is equal to or greater than the glass transition temperature of a desired polycarbonate resin and is less than the melting point of the amorphous polycarbonate. The heat crystallizing method can be easily used because the amorphous carbonate can be crystallized by heating only.

The temperature for the heat crystallizing method $T_c$ (° C.) may be in the range of the glass transition temperature $T_g$ of a desired polycarbonate resin to a melting temperature $T_m$ (° C.) of an amorphous polycarbonate. In particular, since the amorphous carbonate is slowly crystallized at low temperatures, $T_c$ (° C.) may be in the range represented by Inequality 3:

$$T_m-50° C. \leq T_c \leq T_m.$$ [Inequality 3]

$T_c$ may be constant within the range of Inequality 3, or may be changed continuously or discontinuously. Alternatively, $T_c$ may be controlled using a combination of these methods. Particularly, when $T_c$ is changed, $T_c$ is increased at a rate corresponding to an increase of the melting point of the amorphous polycarbonate. In general, as the heating crystallization proceeds, the melting point of the amorphous polycarbonate increases.

When the heat crystallizing method is used with a varying temperature, the amorphous polycarbonate is crystallized more quickly and has a higher melting point than when the heat crystallizing method is used with a constant temperature.

The length of time that the heat crystallizing method is performed is dependent on the chemical composition of the amorphous polycarbonate, the use or non-use of a catalyst, a temperature for crystallizing, a method of crystallizing, or other conditions. Particularly, the length of the time that the heat crystallizing method is performed may be in the range of 1 to 200 hours.

The solid state polymerization may proceed without the addition of a catalyst, because a catalyst that has been used for the prepolymerization remains. In addition, a monohydroxy compound or an arylcarbonate that is produced as a result of the solid state polymerization, may be extracted outside the reaction system, thereby facilitating the reaction. For example, the monohydroxy compound and the arylcarbonate may be removed using an inert gas, such as $N_2$, Ar, He, or $CO_2$, or a lower hydrocarboante gas, or the monohydroxy compound and the arylcarbonate may be removed under a reduced pressure. Alternatively, the monohydroxy compound and the arylcarbonate may be removed using a combination of these methods. When the gas (inert gas, lower hydrocarbon gas) is used, the gas may be heated to a temperature closes to the reacting temperature before the addition thereof.

The shape of the polycarbonate that is used for the solid state polymerization is not limited. For example, the polycarbonate may be pellet-shaped, bead-shaped, or granule-shaped, or may be formed in a powder, because a polycarbonate with a large and abnormal shape deters the reaction and the handling thereof is difficult. In addition, a solid carbonate that is cracked to a predetermined size can be used. In particular, the polycarbonate that is crystallized using a solvent after the prepolymerization is desirable because it is produced typically in a granule-shape or as a powder. In addition, since the polycarbonate is porous, the monohydroxy compound or aryl carbonate that is a reaction side product can be easily extracted.

In addition, when needed, additives, such as a powder, liquid, or gaseous terminator, a branching agent, an antioxidant, and the like may be used for the solid state polymerization. These additives may increase the quality of a polycarbonate resin that will be obtained.

The temperature for the solid state polymerization $T_p$ (° C.) and the time for the solid state polymerization may be determined by the kind (chemical structure, molecular weight, or the like) or shape of the polycarbonate, the kind or amount of a catalyst, a degree of crystallization of the polycarbonate, the melting point of the polycarbonate $T_m'$ (° C.), a degree of polymerization of the polycarbonate that will be obtained, or other conditions. In particular, $T_p$ may be in the range of the glass transition temperature $T_g$ of the polycarbonate resin that will be obtained to a temperature, at which the polycarbonate is not dissolved and exists in a solid state. For example, the solid state polymerization may be performed at the $T_p$ expressed by Inequality 4 below for 1 minute to 100 hours, and preferably, 0.1 minutes to 50 hours:

$$T_m'-50 \leq T_p \leq T_m'.$$ [Inequality 4]

When a polycarbonate resin of a bisphenol A is produced, the solid state polymerization may be performed at a temperature of 150 to 260° C., and preferably 180 to 230° C.

The solid state polymerization may be performed using various mixing methods to uniformly heat a polymer or to easily extract the monohydroxy compound or arylcarbonate that is a reaction side product. The mixing may be realized by using a mixing fan, a rotating reactor, or circulation of a heating gas.

The Mw of the polycarbonate resin that is produced through the solid state polymerization may be in the range of 15,000 to 200,000 g/mol, and preferably, 30,000 to 100,000 g/mol.

For example, when a siloxane-based polycarbonate is used, the Mw thereof may be in the range of 20,000 to 200,000 g/mol, and when a polyester carbonate is used, the Mw of the polyester-based carbonate may be in the range of 20,000 to 200,000 g/mol.

The polycarbonate resin with the Mw described above according to an embodiment of the present invention may be suitable for the industrial use.

The shape of the polycarbonate that is produced through the solid state polymerization may vary according to the shape of a polycarbonate that is used. In general, the produced polycarbonate may be bead-shaped or granule-shaped, or may be a powder. In addition, the produced polycarbonate may have a higher degree of crystallization than a typical polycarbonate. That is, a polycarbonate resin that is produced according to an embodiment of the present invention is formed as a powder. In addition, the crystallized resin that is formed to a predetermined molecular weight in a uniform powder through the solid state polymerization, can be directly introduced to a pressing device without cooling to form in a pellet. Alternatively, the crystallized resin may be directly introduced to a mold to be molded to a predetermined shape without cooling.

A reactor that is used for the prepolymerization, crystallization, and solid state polymerization which are performed to produce a polycarbonate resin according to an embodiment of the present invention, may be a batch type reactor, a continuous type reactor_, or a combination of these. Compared to a conventional prepolymerization that is used to produce a relatively low molecular weight polycarbonate prepolymer, a prepolymerization using transesterification according to an embodiment of the present invention does not require an expensive reactor for a high viscosity fluid that is used for a high temperature melting condensation polymerization, and crystallization may be realized by handling an amorphous polycarbonate using a solvent, or by heating the amorphous polycarbonate, which does not require any specific device. In addition, the solid state polymerization may be performed using any device in which a polycarbonate can be heated and the monohydroxy compound or arylcarbonate that is a reaction side product can be removed.

The present invention will be described in further detail with reference to the following examples. These examples are for illustrative purposes only and are not intended to limit the scope of the present invention.

EXAMPLES

Example 1

(Production of Amorphous Siloxane-Based Polycarbonate Prepolymer)

1,484 g (6.50 mol) of bisphenol-A, 1,478 g (6.90 mol) of diphenylcarbonate, 5.08 g ($1.133 \times 10^{-3}$ mol) of polysiloxane (Dow Corning 3058) were mixed and injected into a reactor in a nitrogen atmosphere. $1 \times 10^{-6}$ mol of a sodium acetic acid and $2.5 \times 10^{-4}$ mole of a tetrabutylphosphonium hydroxide, which were used as a polymerization catalyst, per mole of bisphenol-A, were added to the reactor, mixed and reacted at a jacket temperature of 230° C. for 5 minutes. Then, under a reduced pressure of 1 to 4 mmHg, an ester reaction and a transesterification reaction were performed for 30 minutes. As a result, a low molecular weight amorphous siloxane-based polycarbonate prepolymer with the Mw of 9,095 g/mol was produced.

(Production of Amorphous Siloxane-Based Polycarbonate Through Condensation Polymerization)

The low molecular weight amorphous siloxane-based polycarbonate prepolymer that was prepared, was then placed in a thin film reactor at a temperature of 300° C. under the reacting pressure of equal to or less than 1 mmHg for 30 minutes during which time condensation polymerization occurred. As a result, a medium molecular weight amorphous siloxane-based polycarbonate with the Mw of 15,659 g/mol was produced.

(Production of Crystallized Siloxane-Based Polycarbonate)

The prepared medium molecular weight amorphous siloxane-based polycarbonate was dissolved to a concentration of 0.15 g/ml in methylenechloride at room temperature, and then, 100% methanol was used as a nonsolvent so that a crystallized siloxane-based polycarbonate in powder precipitated.

(Production of High Molecular Weight Crystallized Siloxane-Based Polycarbonate)

The prepared siloxane-based polycarbonate powder was placed in a solid state polymerization reactor, and then a solid state polymerization process was performed at 200° C. at a reduced pressure of 1 mmHg. The Mw of the results is shown in Table 1.

Comparative Example 1

(Production of Crystallized Siloxane-Based Polycarbonate)

A crystallized siloxane-based polycarbonate powder was produced in the same manner as in Example 1 except that the condensation polymerization process was not performed.

(Production of High Molecular Weight Siloxane-Based Polycarbonate Resin)

The prepared crystallized siloxane-based polycarboante was subjected to the solid state polymerization in the same manner as in Example 1. The Mw of the result is shown in Table 1.

Example 2

(Production of Amorphous Polyester Carbonate Prepolymer)

1,500 g (6.57 mol) of bisphenol-A, 1,463 g (6.83 mol) of diphenylcarbonate, 15.89 g ($6.9 \times 10^{-2}$ mol) of 1,10-decanedicarboxylic acid were mixed and injected into a reactor in a nitrogen atmosphere. $2.5 \times 10^{-4}$ mol of an dibutyltin oxide, which was used as a polymerization catalyst, per mole of bisphenol-A, were added to the reactor, mixed and reacted at a jack temperature of 230° C. for 5 minutes. Then, under a reduced pressure of 1 to 4 mmHg, an ester reaction and a transesterification reaction were performed for 30 minutes. As a result, a low molecular weight amorphous polyester carbonate prepolymer with the Mw of 5,908 g/mol was produced.

(Producing Amorphous Polyester Carbonate Through Condensation Polymerization)

The low molecular weight amorphous polyester carbonate prepolymer that was prepared above, was placed in a thin film reactor, in which the temperature was 300° C. and the reacting pressure was equal to or less than 1 mmHg, and then stayed for 30 minutes to occur condensation polymerization. As a result, a medium molecular weight amorphous polyester carbonate with the Mw of 9,576 g/mol was produced.

(Production of Crystallized Polyester Carbonate)

The prepared medium molecular weight amorphous polyester carbonate was dissolved to a concentration of 0.15 g/ml in methylenechloride at room temperature, and then, 100% methanol was used as a nonsolvent so that a crystallized polyester carbonate in powder precipitated.

(Production of High Molecular Weight Crystallized Polyester Carbonate)

The prepared polyester carbonate powder was placed in a solid state polymerization reactor, and then, a solid state polymerization process was performed at 200° C. at a reduced pressure of 1 mmHg. The Mw of the result is shown in Table 1.

Comparative Example 2

(Production of Crystallized Polyester Carbonate)

A crystallized polyester carbonate powder was produced in the same manner as in Example 2 except that the condensation polymerization process was not performed.

(Production of High Molecular Weight Polyester Carbonate Resin)

The prepared crystallized polyester carbonate was subjected to the solid state polymerization in the same manner as in Example 2. The result is shown in Table 1.

TABLE 1

| Solid State Polymerizing Time | Example 1 | Comparative Example 1 | Example 2 | Comparative Example 2 |
|---|---|---|---|---|
| 0 | 15,659 | 9,095 | 9,576 (5,269) | 5,908 (3,589) |
| 2 | 33,227 | 30,448 | 21,398 (11,817) | 16,451 (10,551) |
| 4 | 35,767 | 31,356 | 25,043 (15,463) | 17,930 (12,019) |
| 6 | 37,817 | 33,693 | 26,121 (16,548) | 18,191 (12,285) |
| 8 | 37,914 | 34,246 | 27,379 (17,808) | 18,567 (12,660) |
| 10 | 38,726 | 34,734 | 29,245 (19,663) | 18,874 (12,966) |
| 12 | 39,124 | 34,932 | 29,849 (20,265) | 18,690 (12,743) |

(Values in parentheses represent number average molecular weights)

Comparative Example 3

An amorphous polyester carbonate was produced in the same manner as in Example 2 except that $1 \times 10^{-6}$ mol of a sodium acetic acid and $2.5 \times 10^{-4}$ mole of a tetrabutylphosphonium hydroxide, which were used as a polymerization catalyst, based on 1 mole of a bisphenol-A, were added.

The Mw of the amorphous polyester carbonate was 2,943 g/mol, and the color intensity was decreased.

Comparative Example 4

An amorphous polyester carbonate was produced in the same manner as in Example 2 except that $2.5 \times 10^{-4}$ mol of antimony oxide based on 1 mole of bisphenol-A was used as a polymerization catalyst.

The Mw of the amorphous polyester carbonate was 2,542 g/mol, the color intensity was decreased, and a degree of transparency was decreased.

The high molecular weight siloxane-based polycarbonate prepared according to Example 1, which was produced by condensation polymerizing a low molecular weight amorphous siloxane-based polycarbonate prepolymer and then by performing solid state polymerization, was compared with the high molecular weight siloxane-based polycarbonate prepared according to Comparative Example 1, which was produced through solid state polymerization without condensation polymerization. According to the present invention, a siloxane-based polycarbonate resin with an Mw of 35,000 g/mol or greater could be produced in less than 4 hours. Typically, according to a conventional solid phase polymerization, a siloxane-based polycarbonate resin with a Mw of 35,000 g/mol or greater cannot be produced with a reaction time of less than 10 hours.

Likewise, the polyester carbonate prepared in Example 2 was compared with the polyester carbonate prepared in Comparative Example 2, in which the solid state polymerization was performed without the condensation polymerization. As a result, a siloxane-based polycarbonate with Mw of 15,000 g/mol or greater was produced in 4 hours. Typically, a siloxane-based polycarbonate with such a Mw of 15,000 g/mol or greater cannot be produced through solid state polymerization in a reaction time of 10 hours or less.

A method of preparing a polycarbonate according to the present invention includes a reduced-pressure condensation method to reduce the reaction time for a solid state polymerization process. In addition, the method is more stable due to the non-use of a poisonous phosgene. Furthermore, the method guarantees a polycarbonate with high quality.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing a polycarbonate resin, the method comprising:

transesterifying diarylcarbonate, an aromatic dihydroxy compound, and polysiloxane in the presence of a catalyst to produce a low molecular weight amorphous polycarbonate prepolymer having a weight average molecular weight (Mw) of 1,500 to 20,000 g/mol;

condensation polymerizing the low molecular weight amorphous polycarbonate prepolymer to produce a medium molecular weight amorphous polycarbonate having a Mw of 10,000 to 30,000 g/mol;

crystallizing the medium molecular weight amorphous polycarbonate to produce a crystallized polycarbonate; and solid state polymerizing the crystallized polycarbonate to produce a high molecular weight polycarbonate having a Mw of 20,000 to 200,000 g/mol.

2. A method of preparing a polycarbonate resin, the method comprising:

transesterifying diarlycarbonate, an aromatic dihydroxy compound, and a dicarboxylic acid compound in the presence of a catalyst to produce a low molecular weight amorphous polycarbonate prepolymer having a weight average molecular weight (Mw) of 1,500 to 20,000 g/mol;

condensation polymerizing the low molecular weight amorphous polycarbonate prepolymer to produce a medium molecular weight amorphous polycarbonate having a Mw of 10,000 to 30,000 g/mol;

crystallizing the medium molecular weight amorphous polycarbonate to produce a crystallized polycarbonate; and solid state polymerizing the crystallized polycarbonate to produce a high molecular weight polycarbonate having a Mw of 20,000 to 200,000 g/mol.

3. The method of claim 1, wherein the aromatic dihydroxy compound is represented by formula 1:

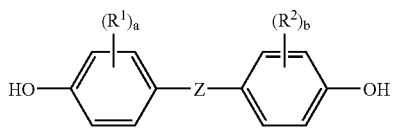

(1)

where $R^1$ and $R^2$ are each independently a halogen atom or a C1-C8 alkyl group;
a and b are each independently an integer of 0 through 4; and
Z is a C1-C8 alkylene group, a C2-C8 alkyliden group, a C5-C15 cycloalkylene group, a C5-C15 cycloalkylidene group, —S—, —SO—, —SO$_2$—, —O—, —CO—, a compound represented by formula 2, or a compound represented by formula 3:

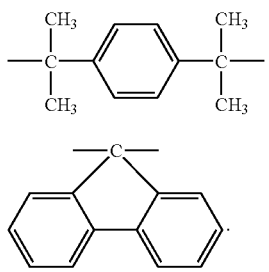

(2)

(3)

4. The method of claim 1, wherein the diarylcarbonate is a compound represented by formula 4 or 5:

(4)

where $Ar^1$ and $Ar^2$ are each independently an aryl group, and

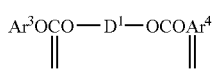

(5)

where $Ar^3$ and $Ar^4$ are each independently an aryl group, and $D^1$ is a residue obtained by removing two hydroxyl groups from the aromatic dihydroxy compound represented by formula 1.

5. The method of claim 1, wherein the polysiloxane compound is a compound represented by formula 6:

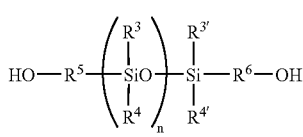

(6)

where n is an integer of 1 through 500;
$R^3$, $R^{3'}$, $R^4$ and $R^{4'}$ are each independently a hydrogen atom and a C1-C20 alkyl group, wherein some or all of the entire hydrogen atoms of the alkyl group may be substituted with a halogen atom;
$R^5$ and $R^6$ are each independently a linear or branched C1-C20 alkylene group, a monocyclic or polycyclic C6-C30 arylene group, or —$R^7$—X—$R^8$—, wherein $R^7$ and $R^8$ are each independently a substituted or nonsubstituted C1-C20 alkylene group or a substituted or nonsubstituted C6-C30 arylene group; and
X is —O—, —S—, —SO—, —SO$_2$—, or —CO—.

6. The method of claim 1, wherein the polysiloxane compound is represented by formula 7:

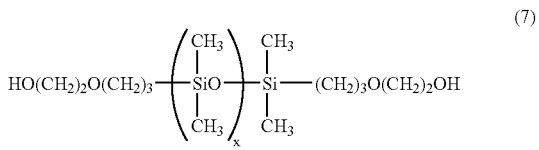

(7)

where x is an integer of 1 through 500.

7. The method of claim 1, wherein the concentration of the diarylcarbonate is in the range of 1.0 to 1.5 mol % based on 1 mol of the dihydroxy compound.

8. The method of claim 1, wherein the concentration of the polysiloxane compound is in the range of 0.01 to 20 mol % based on 1 mol of the dihydroxy compound.

9. The method of claim 2, wherein the dicarboxylic compound is a compound represented by formula 8:

(8)

where $R^9$ is a substituted or nonsubstituted C4-C30 aryl group, a substituted or nonsubstituted C1-C10 alkyl group, or a substituted or nonsubstituted C5-C30 cycloalkyl group.

10. The method of claim 2, wherein the concentration of the dicarboxylic acid is in the range of $10^{-4}$ to 1 mol based on 1 mole of the diarylcarbonate compound.

11. The method of claim 1, wherein the catalyst is one of a metal compound catalyst, a non-metal compound catalyst, the combination of these.

12. The method of claim 11, wherein the metal compound catalyst is a compound selected from the group consisting of a salt compound selected from the group consisted of a hydroxide, acetate, alkoxide, carbonate, hydride, hydrate, or oxide of an alkali metal or an alkali earth metal; an organometallic compound containing a transition metal selected from the group consisted of Zn, Cd, Ti, and Pb; or either an aluminum hydride or borohydride.

13. The method of claim 11, wherein the non-metal compound catalyst is a quaternary ammonium salt selected from the group consisted of tetramethyl ammonium hydroxide, tetramethyl ammonium acetate, tetramethyl ammonium formate, tetramethyl ammonium carbonate, tetraethyl ammonium hydroxide, tetrapropyl ammonium hydroxide, tetrabutyl ammonium hydroxide, tetraphenyl ammonium hydroxide, trimethylphenyl ammonium hydroxide; quaternary phosphonium salt selected from the group consisted of tetramethyl phosphonium hydroxide, tetramethyl phosphonium acetate, tetramethyl phosphonium formate, tetramethylphosphonium carbonate, tetraethyl phosphonium hydroxide, tetrapropyl phosphonium hydroxide, tetrabutyl phosphonium hydroxide, tetraphenyl phosphonium hydroxide, trimethylphenyl phosphonium hydroxide; primary, secondary, or a tertiary amine compound; or pyridine.

14. The method of claim 11, wherein the concentration of the metal compound catalyst is $10^{-8}$ to $10^{-3}$ mole and the concentration of the non-metal compound catalyst is $10^{-6}$ to $10^{-1}$ mole, based on 1 mol of the aromatic dihydroxy compound.

15. The method of claim 2, wherein the catalyst is a tin-based catalyst.

16. The method of claim 15, wherein the tin-based catalyst is a tin compound selected from the group consisting of dialkyltin trichloride, dialkyltin dichloride, dialkyltin oxide, dialkyltin dialkoxide, dialkyltin dicarboxylate, and tetraalkyl tin.

17. The method of claim 15, wherein the tin-based catalyst is a compound represented by

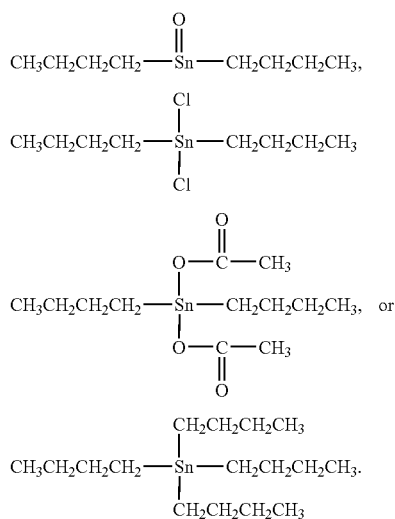

18. The method of claim 2, wherein the concentration of the catalyst is $10^{-6}$ to $10^{-1}$ mol based on 1 mole of the aromatic dihydroxy compound.

19. The method of claim 1, wherein operation of condensation polymerization is performed in a reactor selected from the group consisting of a rotating disk reactor, a rotating cage reactor, and a thin film reactor.

20. The method of claim 2, wherein the aromatic dihydroxy compound is represented by formula 1:

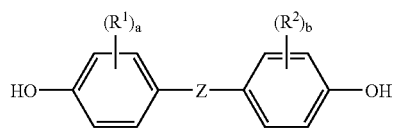

where $R^1$ and $R^2$ are each independently a halogen atom or a C1-C8 alkyl group;

a and b are each independently an integer of 0 through 4; and

Z is a C1-C8 alkylene group, a C2-C8 alkyliden group, a C5-C15 cycloalkylene group, a C5-C15 cycloalkylidene group, —S—, —SO—, —SO₂—, —O—, —CO—, a compound represented by formula 2, or a compound represented by formula 3:

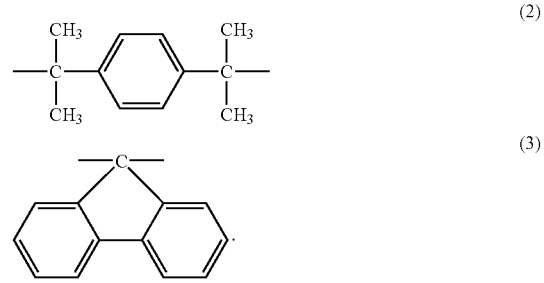

21. The method of claim 2, wherein the diarylcarbonate is a compound represented by formula 4 or 5:

where $Ar^1$ and $Ar^2$ are each independently an aryl group, and

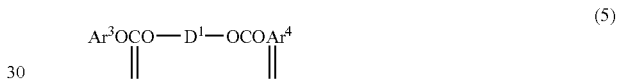

where $Ar^3$ and $Ar^4$ are each independently an aryl group, and $D^1$ is a residue obtained by removing two hydroxyl groups from the aromatic dihydroxy compound represented by formula 1.

22. The method of claim 2, wherein the catalyst is one of a metal compound catalyst, a non-metal compound catalyst, the combination of these.

23. The method of claim 22, wherein the metal compound catalyst is a compound selected from the group consisting of a salt compound selected from the group consisted of a hydroxide, acetate, alkoxide, carbonate, hydride, hydrate, or oxide of an alkali metal or an alkali earth metal; an organometallic compound containing a transition metal selected from the group consisted of Zn, Cd, Ti, and Pb; or either an aluminum hydride or borohydride.

24. The method of claim 22, wherein the non-metal compound catalyst is a quaternary ammonium salt selected from the group consisted of tetramethyl ammonium hydroxide, tetramethyl ammonium acetate, tetramethyl ammonium formate, tetramethyl ammonium carbonate, tetraethyl ammonium hydroxide, tetrapropyl ammonium hydroxide, tetrabutyl ammonium hydroxide, tetraphenyl ammonium hydroxide, trimethylphenyl ammonium hydroxide; quaternary phosphonium salt selected from the group consisted of tetramethyl phosphonium hydroxide, tetramethyl phosphonium acetate, tetramethyl phosphonium formate, tetramethylphosphonium carbonate, tetraethyl phosphonium hydroxide, tetrapropyl phosphonium hydroxide, tetrabutyl phosphonium hydroxide, tetraphenyl phosphonium hydroxide, trimethyiphenyl phosphonium hydroxide; primary, secondary, or a tertiary amine compound; or pyridine.

25. The method of claim 22, wherein the concentration of the metal compound catalyst is $10^{-8}$ to $10^{-3}$ mole and the concentration of the non-metal compound catalyst is $10^{-6}$ to $10^{-1}$ mole, based on 1 mol of the aromatic dihydroxy compound.

26. The method of claim 2, wherein operation of condensation polymerization is performed in a reactor selected from the group consisting of a rotating disk reactor, a rotating cage reactor, and a thin film reactor.

* * * * *

UNITED STATES PATENT AND TRADEMARK OFFICE
CERTIFICATE OF CORRECTION

PATENT NO.       : 7,332,559 B2
APPLICATION NO.  : 11/255515
DATED            : February 19, 2008
INVENTOR(S)      : Mijeung Hong et al.

It is certified that error appears in the above-identified patent and that said Letters Patent is hereby corrected as shown below:

Column 2, line 50, "the" should read --an--.

Column 3, line 13, delete "a".

Column 5, line 6, delete "a".

Column 11, line 49, "device used" should read --device being used--.

Column 14, line 3, delete comma (",").

Column 14, line 49, delete "a".

Column 15, line 23, delete "_" after the word "reactor".

Column 15, line 65, delete comma (",").

Column 17, line 44, delete "a".

Column 20, line 39, delete "one of".

Column 20, line 41, delete the phrase "the combination of these." and insert --or a combination of said metal compound catalyst and said non-metal compound catalyst.--

UNITED STATES PATENT AND TRADEMARK OFFICE
CERTIFICATE OF CORRECTION

PATENT NO. : 7,332,559 B2
APPLICATION NO. : 11/255515
DATED : February 19, 2008
INVENTOR(S) : Mijeung Hong et al.

It is certified that error appears in the above-identified patent and that said Letters Patent is hereby corrected as shown below:

Column 22, line 37, delete "one of".

Column 22, line 39, delete the phrase "the combination of these." and insert --or a combination of said metal compound catalyst and said non-metal compound catalyst.--

Signed and Sealed this

Twenty-fourth Day of March, 2009

JOHN DOLL
*Acting Director of the United States Patent and Trademark Office*